(12) United States Patent
Bielby

(10) Patent No.: US 11,961,312 B2
(45) Date of Patent: Apr. 16, 2024

(54) AUTOMATIC GENERATION OF PROFILES BASED ON OCCUPANT IDENTIFICATION

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 239 days.

(21) Appl. No.: 16/915,980

(22) Filed: Jun. 29, 2020

(65) Prior Publication Data

US 2021/0406570 A1    Dec. 30, 2021

(51) Int. Cl.
*G06V 20/59*    (2022.01)
*B60K 31/16*    (2006.01)
(Continued)

(52) U.S. Cl.
CPC ............ *G06V 20/593* (2022.01); *B60K 31/16* (2013.01); *B60W 60/001* (2020.02);
(Continued)

(58) Field of Classification Search
CPC ...... G06V 40/00; G06V 40/10; G06V 40/103; G06V 40/107; G06V 40/1306; G06V 40/1312; G06V 40/1318; G06V 40/1324; G06V 40/1335; G06V 40/1347; G06V 40/16; G06V 40/161; G06V 40/162; G06V 40/164; G06V 40/165; G06V 40/166; G06V 40/167; G06V 40/168; G06V 40/169; G06V 40/171; G06V 40/172; G06V 40/173; G06V 40/174; G06V 40/179; G06V 40/18; G06V 40/40; G06V 40/50; G06V 10/768; G06V 20/59; G06V 20/36; G06V 20/40;
(Continued)

(56) References Cited

U.S. PATENT DOCUMENTS

2009/0082926 A1*   3/2009   Klein ...................... B60R 22/48
                                                                        701/45
2014/0066049 A1    3/2014   Cho et al.
(Continued)

FOREIGN PATENT DOCUMENTS

JP    2011195084    10/2011
KR    20130047481    5/2013

OTHER PUBLICATIONS

International Search Report and Written Opinion, PCT/US2021/038454, dated Oct. 5, 2021.

*Primary Examiner* — Adam R Mott
*Assistant Examiner* — Erick T. Detweiler
(74) *Attorney, Agent, or Firm* — Greenberg Traurig

(57) ABSTRACT

A profile is automatically generated for an occupant of a vehicle. In one approach, data is collected from an interior of a vehicle to determine whether an occupant is present. If an occupant is present, a local profile is automatically generated. The local profile is sent to a remote computing device. The remote computing device links the local profile to a remote profile stored by the remote computing device. Configuration data is generated by the remote computing device based on linking the local and remote profiles. The configuration data is sent to the vehicle and used by the vehicle to control the operation of one or more components of the vehicle.

16 Claims, 4 Drawing Sheets

(51) Int. Cl.
*B60W 60/00* (2020.01)
*G06F 18/214* (2023.01)
*G06F 18/25* (2023.01)
*G06V 40/16* (2022.01)
*G06V 40/50* (2022.01)

(52) U.S. Cl.
CPC .... *B60W 60/0011* (2020.02); *B60W 60/0016* (2020.02); *B60W 60/0017* (2020.02); *G06F 18/214* (2023.01); *G06F 18/254* (2023.01); *G06V 40/166* (2022.01); *G06V 40/50* (2022.01); *B60W 60/0015* (2020.02)

(58) Field of Classification Search
CPC ...... G06V 20/41; G06V 20/46; G06V 20/593; G06V 20/597; G06V 20/60; G06V 20/64; G06K 9/00; G06K 9/62; G06K 9/6217; G06K 9/6218; G06K 9/6254; G06K 9/6255; B60K 31/16; B60W 40/08; B60W 60/001; B60W 60/0011; B60W 60/0015; B60W 60/0016; B60W 60/0017; B60W 2540/00; B60W 2540/01; B60W 2540/041; B60W 2540/043; B60W 2540/045; B60W 2540/047; B60W 2540/049; B60W 2540/22; B60W 2540/221; B60W 2540/223; B60W 2540/225; B60W 2540/229; B60W 2540/24; B60W 2540/26; B60W 2420/42; G06F 18/214; G06F 18/254

See application file for complete search history.

(56) References Cited

U.S. PATENT DOCUMENTS

| | | |
|---|---|---|
| 2015/0232064 A1 | 8/2015 | Cudak et al. |
| 2017/0247000 A1* | 8/2017 | Ricci ..................... B60R 16/037 |
| 2017/0313322 A1* | 11/2017 | Onorato ............ B60W 50/0098 |
| 2019/0291719 A1 | 9/2019 | Tiziani |
| 2021/0031778 A1* | 2/2021 | Farooq ................... B60K 28/02 |
| 2021/0124963 A1* | 4/2021 | Morimoto .............. G08B 21/00 |
| 2021/0284175 A1* | 9/2021 | Mehdi .................. B60R 16/037 |

* cited by examiner

AUTOMATIC GENERATION OF PROFILES BASED ON OCCUPANT IDENTIFICATION

FIELD OF THE TECHNOLOGY

At least some embodiments disclosed herein relate generally to object detection, and more particularly, but not limited to generating a profile based on identification of an occupant in a vehicle.

BACKGROUND

Various types of vehicles can include cars, trucks, boats, and airplanes, as well as vehicles or vehicular equipment for military, construction, farming, or recreational use. Vehicles can be customized or personalized via vehicle electronics. Vehicle electronics can include electronic systems used in vehicles. Vehicle electronics can include electronics for the drivetrain of a vehicle, the body or interior features of the vehicle, entertainment systems in the vehicle, and other parts of the vehicle. Ignition, engine, and transmission electronics can be found in vehicles with internal combustion powered machinery such as conventional cars, trucks, motorcycles, boats, planes, military vehicles, forklifts, tractors and excavators. Related elements for control of electrical vehicular systems are also found in hybrid and electric vehicles such as hybrid or electric automobiles. For example, electric cars can rely on power electronics for main propulsion motor control and managing the battery system.

In general, vehicle electronics can be distributed systems and can include a powertrain control module and powertrain electronics, a body control module and body electronics, interior electronics, and chassis electronics, safety and entertainment electronics, and electronics for passenger and driver comfort systems. Also, vehicle electronics can include electronics for vehicular automation. Such electronics can include or operate with mechatronics, artificial intelligence, and distributed systems.

A vehicle using automation for complex tasks, including navigation, may be referred to as semi-autonomous. A vehicle relying solely on automation can be referred to as autonomous. The Society of Automotive Engineers (SAE) has categorized autonomy into six levels: Level 0 or no automation. Level 1 or driver assistance, wherein the vehicle can control either steering or speed autonomously in specific circumstances to assist the driver. Level 2 or partial automation, wherein the vehicle can control both steering and speed autonomously in specific circumstances to assist the driver. Level 3 or conditional automation, wherein the vehicle can control both steering and speed autonomously under normal environmental conditions, but requires driver oversight. Level 4 or high automation, wherein the vehicle can complete a travel autonomously under normal environmental conditions, not requiring driver oversight. Level 5 or full autonomy, wherein the vehicle can complete a travel autonomously in any environmental conditions.

User profiles generally can be used to customize a system such as a vehicle for a particular user. Various types of user profiles can include electronic, digital, or computerized representations of a specific user. User profiles can be used by operating systems, computer programs, other types of computing systems, e-commerce and social media systems, as well as automotive infotainment systems. In one example, a mobile user profile is a type of user profile that can be used by at least a mobile device.

A user profile can include a representation of a person's identity and in some cases can be considered a computer representation of a user model. In one example, a user model is data structure that can be used to capture certain characteristics about an individual user. The process of obtaining the user profile is sometimes referred to as user modeling or profiling. A user profile can also be used to store the description of characteristics of a person.

The data in a user profile can be used by various types of systems that consider the characteristics and/or preferences of a person in the operation of the system. For example, user profiles can be used by vehicle systems, such as vehicle infotainment systems and passenger comfort systems.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
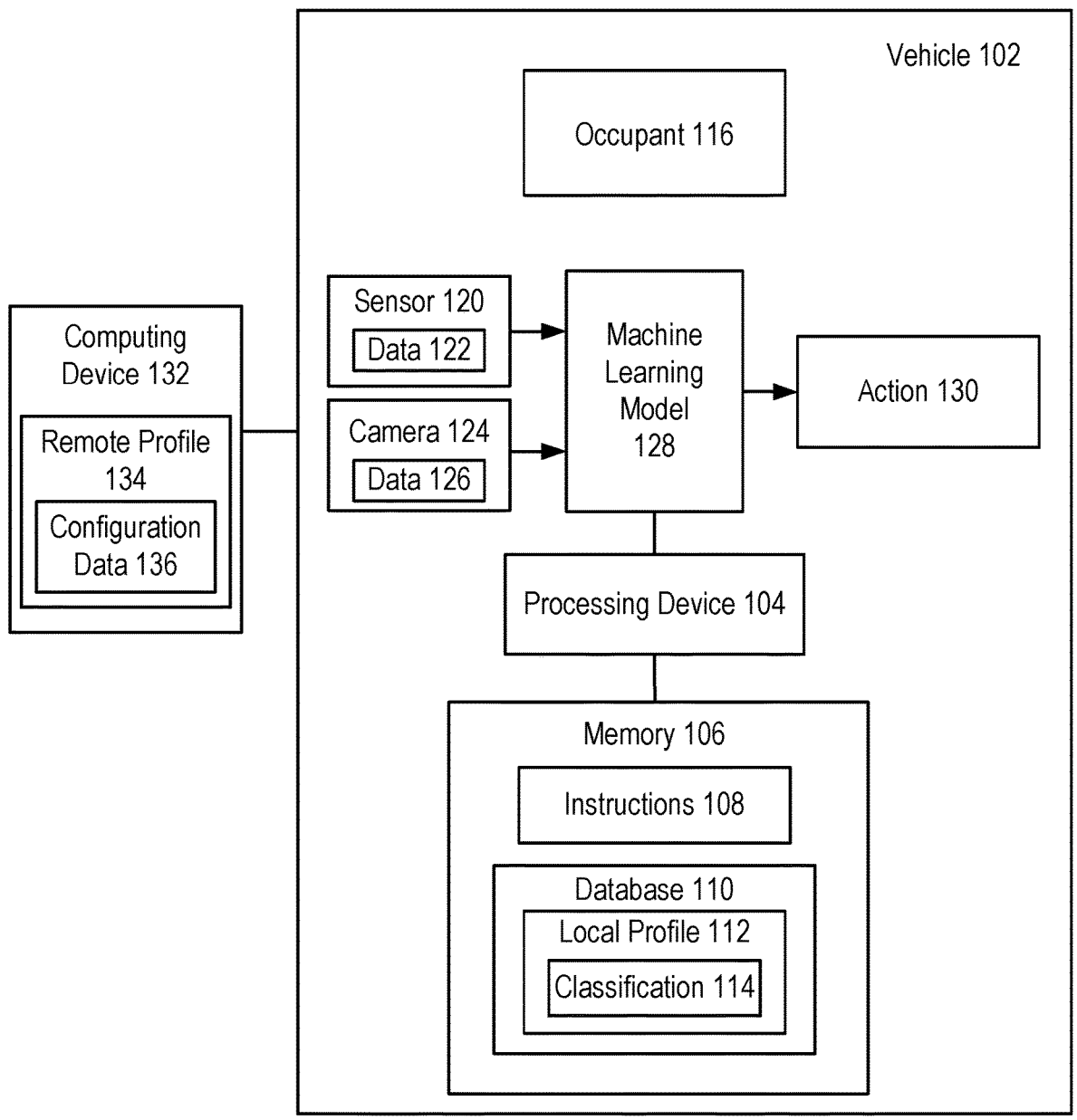
FIG. 1 shows a vehicle configured to identify an occupant located in the vehicle, and perform one or more actions based on configuration data received from a remote profile, in accordance with some embodiments.

The following disclosure describes various embodiments for generating a profile based on identification of an occupant in a vehicle. At least some embodiments herein relate to a vehicle that performs one or more actions based on the generated profile. In some embodiments the generated profile is a local profile that is sent to a remote computing device that links the local profile with a remote profile for the occupant that is stored on the remote computing device. Based on linking the local profile with the remote profile, the remote computing device generates configuration data that is sent to the vehicle. The configuration data can be used by the vehicle to perform one or more actions. The vehicle may be, for example, an autonomous vehicle, a manually-operated vehicle, or an electric vehicle. In various examples, the vehicle is a car, a boat, or an airplane.

In prior vehicles, a user profile selected for use by a vehicle may not contain up-to-date and/or accurate data for a user. For example, this may occur if a user profile stored locally on a vehicle has not been updated for a long period of time, and/or if conditions in which a vehicle will be operated are significantly different than what has been encountered by the vehicle in prior usage. The foregoing can cause one or more technical problems such as significantly degrading performance of the vehicle by reducing the extent of proper and/or accurate customization for a user of the vehicle. In some cases, the vehicle may be disabled due to a lack of proper configuration. In other cases, even if the vehicle is operational, the efficiency of the operation is significantly reduced due to the improper configuration. For example, a configuration for a gas-powered engine or electric motor may result in sub-optimal operation, which causes waste of resources and/or excessive pollution by increasing fuel or electricity consumption, and/or by increasing undesirable or toxic emissions.

In another example, a vehicle may have previously provided a particular service for a user. The service may have been provided based on a stored user profile. However, if one or more components of the vehicle that were previously used to provide the service have changed, then the user profile may not correctly or properly match the changed components. In one example, the component may have changed due to an over-the-air software update for a controller of the component. In such a case, the existing user profile may cause the controller to fail to function, or to function poorly and/or insecurely due to incompatibilities with the software update.

Various embodiments of the present disclosure provide a technological solution to one or more of the above technical problems. In one embodiment, a vehicle automatically generates profiles for one or more occupants of the vehicle. In one example, the vehicle captures and stores facial images of the occupants and uses data regarding the facial images to establish the profiles. In one embodiment, the generated profiles can be linked to cloud-based profiles (e.g., profiles stored on a remote cloud server) to provide various services by the vehicle. Examples of the services can include use in law enforcement, insurance, customization of the vehicle, personalization of the vehicle, training of an artificial intelligence system on or used with the vehicle, etc.

In general, an artificial intelligence system will include a machine-learning model. The machine-learning model may be trained using a supervised method where the parameters in the machine-learning model are adjusted to minimize or reduce the error between known outputs resulted from respective inputs and computed outputs generated from applying the inputs to the machine-learning model. Examples of supervised learning/training methods include reinforcement learning, and learning with error correction.

Alternatively, or in combination, a machine-learning model may be trained using an unsupervised method where the exact outputs resulting from a given set of inputs are not known before the completion of training. The machine-learning model can be trained to classify an item into a plurality of categories, or data points into clusters. Multiple training algorithms can be employed for a sophisticated machine learning/training paradigm.

In one example, an artificial intelligence system may be configured as an artificial neural network (ANN) or as a convolutional neural network (CNN) that is trained using reinforcement learning. For example, the artificial intelligence system may gather images, voice recordings, and other sensor data for one or more persons in a vehicle and store the data in a database. Each time a person enters the vehicle, the person is identified in the database and the data for that person is reinforced in the machine-learning model. Over time the machine-learning model captures sensor data under different conditions (e.g., different lighting conditions, different angles, etc.) and different characteristics of the person (e.g., changes in appearance—clothing, glasses, facial hair, etc.), and will learn and reinforce recognition of the person.

In one example, the machine-learning model may use data from a remote profile stored on a remote computing device (e.g., a social network server) to augment data for the person stored in a local profile in the database. The machine-learning model may use data from the remote profile and data from the local profile to identify the person and configure the vehicle.

In one embodiment, a method comprises: collecting data (e.g., using a camera) from an interior of a vehicle; determining, based on the collected data, whether an occupant is present in the interior (e.g., determining that a detected object corresponds to a facial image); in response to determining that a first occupant is present in the interior, generating a local profile for the first occupant; sending, via wireless communication, the local profile to a computing device (e.g., a remote computing device or cloud-based server), wherein the computing device is configured to link the local profile to a remote profile stored by the computing device; receiving, by the vehicle from the computing device, configuration data, wherein the configuration data is generated by the computing device based on linking the local profile to the remote profile; and performing, based on the received configuration data, at least one action associated with the vehicle.

In one example, the performed action is a service provided by the vehicle. The service is controlled by a controller of the vehicle based on the configuration data.

In one embodiment, a prior action of a vehicle (e.g., a prior function performed by and/or a service provided by the vehicle) has previously been performed for an occupant of the vehicle based on a locally-stored user profile. In one example, the occupant is a person that has previously driven the vehicle one or more times. When the occupant is newly-identified as being currently present in the vehicle (e.g., the driver has just entered the vehicle and is now sitting in the driver's seat preparing to drive the vehicle), a local profile of the occupant is sent to a cloud-based server. The cloud-based server stores remote profiles for various occupants of vehicles. One of the stored remote profiles is associated with the identified occupant.

The server selects one of the remote profiles that corresponds to the identified occupant. Configuration data is retrieved from the remote profile by the server, and then sent to the vehicle (e.g., using a wireless network). The vehicle uses the configuration data to again perform the prior action for the identified occupant, but to do so in a manner that is updated based on the configuration data received from the server. In one example, a prior electronic service provided to an occupant is provided in a manner that is updated by the vehicle based on the configuration data received from the server.

FIG. 1 shows a vehicle 102 configured to detect an occupant 116 in the vehicle 102, identify the occupant 116, and to perform one or more actions 130 based on the identity of the occupant, in accordance with some embodiments. In one embodiment, the vehicle 102 uses a machine-learning model 128 to identify the occupant 116 of the vehicle. In other embodiments, other approaches can be used to identify or detect the occupant.

Vehicle 102 includes a processing device 104. The processing device 104 uses machine-learning model 128 and a database 110, along with input from camera(s) 124, and/or sensor(s) 120, to recognize the occupant 116. The processing device 104 may be, for example, a microprocessor, graphics processor, embedded processor, embedded computer, system on a chip, ASIC, FPGA, or other processing device.

Vehicle 102 contains memory 106 connected to the processing device 104. Memory 106 may be non-volatile memory or a combination of non-volatile and volatile memories. For example, memory 106 may contain flash memory (e.g., SLC, MLC, TLC, QLC, etc.), 3D XPoint memory, DRAM, SRAM, other memory technologies, or any combination of memory technologies. Memory 106 may be in any form including, for example, solid-state disk, compact flash module, PCIe card, NVMe module, DIMM, SIMM, soldered to a motherboard, or other formfactor.

Memory 106 contains instructions 108 used by the processing device 104 to implement occupant identification. Instructions 108 may include, for example, instructions the processing device 104 uses in collecting data (e.g., camera data 126, or sensor data 122), implementing the machine-learning model 128, communicating with an external computing device 132 (e.g., sending sensor data 122 to the computing device 132 and updating a remote profile 134 with the sensor data 122), and taking one or more action(s) 130 when an occupant 116 is identified.

The memory 106 also contains database 110. Database 110 contains a local profile 112 for the occupant 116 of the vehicle 102. The local profile 112 may store data for the occupant 116 of the vehicle 102, such as, for example, a facial image or voiceprint. The local profile 112 may also store data regarding the classification 114 of occupant 116 (e.g., adult, child, driver, driver with learner's permit, etc.). The database 110 may be one of many types of database. For example, database 110 may be a relational database or non-relational database, and may use any structure and access method (e.g., SQL, NoSQL, XML, etc.). In one embodiment, the database 110 is stored in the same memory 106 as the instructions 108. In one embodiment, the database 110 and instructions 108 are stored in separate memory devices. In one embodiment, the database 110 is spread across multiple memory devices.

Input used for occupant identification may come from multiple sources including, for example, data 126 from one or more camera(s) 124 (e.g., one or more camera(s) 124 directed toward the rear of the vehicle 102 to capture facial images of an occupant 116 in the vehicle 102, or otherwise directed towards a portion of the interior of vehicle 102), and data 122 from one or more sensor(s) 120. Data 126 from camera(s) 124 may include, for example, still pictures or video data of an occupant 116 within the vehicle 102. Data 122 from sensor(s) 120 may include, for example, voiceprint data for the occupant 116 of the vehicle 102. Input data for the occupant 116 of the vehicle 102 is stored in a local profile 112 within database 110.

In one embodiment, the local profile 112 for the occupant 116 is sent through a wireless communication link to a computing device 132. Computing device 132 is a server that stores remote profiles 134 for many occupants 116 and many vehicles, including vehicles other than vehicle 102. Computing device 132 determines a correlation between the local profile 112 and a remote profile 134 and links the local profile 112 to the remote profile 134.

The remote profile 134 stores configuration data 136 for the occupant 116. In one example, the configuration data 136 provides data for configuring one or more components of vehicle 102. In one example, the component is an engine, electric motor, transmission, steering system, braking system, heating or cooling system, electronic information or entertainment system, etc. In one embodiment, the component is a device including vehicle electronics and that is mounted to the vehicle.

In one embodiment, the computing device 132 may use a machine-learning model (not shown), along with inputs, such as, for example, local profile 112 and remote profile 134, to generate configuration data 136 for occupant 116. Configuration data 136 may contain, for example, vehicle configuration preferences for occupant 116 (e.g., seat and mirror positions, favorite radio stations, temperature and ventilation preferences, etc.), location preferences (e.g., favorite restaurants, shopping, entertainment venues, gas stations, hotels, etc.), and/or social connections (e.g., family members and friends identified from social networking accounts, such as, for example, Facebook, Instagram, Twitter, etc.). Remote profile 134 may also contain historical data for occupant 116 gathered from one or more vehicles, including vehicles other than vehicle 102.

In response to receiving the local profile 112 for the occupant 116 of vehicle 102, the computing device 132 sends to vehicle 102 the configuration data 136 from the remote profile 134 linked to the local profile 112.

In one embodiment, processing device 104 uses machine-learning model 128 for occupant identification. The machine-learning model 128 may take data, such as, for example, camera data 126, sensor data 122, data from local profile 112, and configuration data 136 as input, and run algorithms (e.g., facial recognition, voice recognition, etc.) to identify the occupant 116.

Vehicle 102 may perform one or more action(s) 130 based on the output of the machine-learning model 128. Action(s) 130 may include, for example, configuring the vehicle 102 for operation (e.g., adjusting seats or mirrors), loading and executing software (e.g., loading contacts or preferred destinations into a vehicle navigation system, loading preferred radio stations or entertainment options into a vehicle entertainment system, etc.), collecting sensor data 122 (e.g., a voiceprint, etc.) and storing the sensor data 122 in the local profile 112, and/or enforcing a policy of the vehicle 102 (e.g., restricting vehicle speed based on the road on which the vehicle is travelling and/or classification 114 of the occupant 116, etc.). Action 130 may also include using the configuration data 136 to update the machine-learning model 128 used by vehicle 102 to control one or more function of the vehicle (e.g., vehicle functions in a rental car may be automatically configured for occupant 116 based on configuration data 136).

Figure 2:
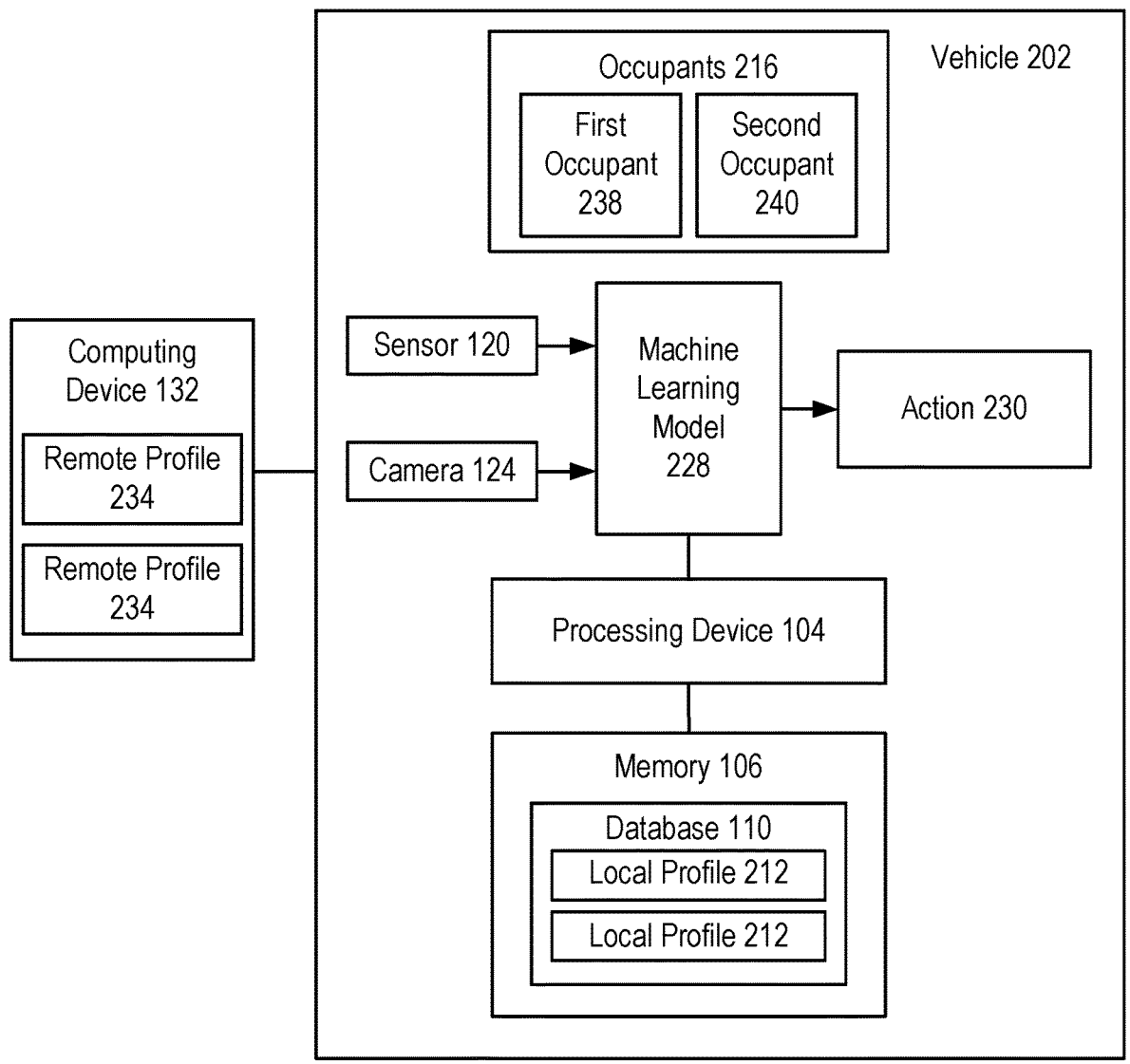
FIG. 2 shows a vehicle configured to identify multiple occupants in the vehicle, and perform one or more actions based on the identities of the occupants, in accordance with some embodiments.

FIG. 2 shows a vehicle 202 configured to detect multiple occupants 216 in the vehicle, identify occupants 216, and to perform one or more actions 230 based on the identities of the occupants 216, according to some embodiments. A separate local profile 212 is generated for a first occupant 238 and for each additional occupant, identified in the figure as a second occupant 240. Each local profile 212 may store data for the respective occupant 216, such as, for example, facial image, voiceprint, location of the occupant 216 within the vehicle 202, and/or classification 114. For example, the local profile 212 for each occupant 216 may contain the same data (e.g., same type of data and/or identical data values) as local profile 112, or may contain different data.

In one embodiment, database 110 includes one or more local profiles 212, with one profile for each of the occupants 216. Each local profile 212 is sent through a wireless communication link to computing device 132 (e.g., after detecting the respective occupant 216). In one embodiment, each local profile 212 is generated in response to detection of an occupant. In one embodiment, each local profile 212 already exists when the occupant is detected. In response to the detection, a generated or an existing local profile 212 is sent to computing device 132.

Computing device 132 links the local profiles 212 for the occupants 216, sent from vehicle 202, to remote profiles 234. Each remote profile 234 stores configuration data for the linked occupant 216. Configuration data may contain, for example, associations between the first occupant 238 and second occupant 240 in addition to the configuration data 136 previously identified for single occupant 116.

In response to receiving the local profiles 212 for the occupants 216 of vehicle 202, the computing device 132 sends to vehicle 202 the configuration data from the remote profiles 234 linked to the local profiles 212. In one embodiment, the machine-learning model 228 may take data, such as, for example, camera data, sensor data, data from local profiles 212, and configuration data for the first occupant 238 and second occupant(s) 240 as input, and run algorithms (e.g., facial recognition, voice recognition, etc.) to identify the occupants 216.

Vehicle 202 may take one or more action(s) 230 based on the output of the machine-learning model 228. In one embodiment, the output is an identification of one or more occupants.

In another embodiment, multiple machine learning models are implemented. An output from a first model identifies an occupant. An output from a second model identifies one or more of actions 230. An input to the second model can include the output from the first model. Data from camera 124 and/or sensor 120 can be an input to the first or second model. Data from remote profile 234 that has been linked to an occupant can be another input to the first or second model.

Action(s) 230 may include, for example, configuring one or more functions of the vehicle 202 for use by both the first occupant 238 and the second occupant 240 (e.g., loading contacts or preferred destinations into a vehicle navigation system, loading preferred radio stations or entertainment options into a vehicle entertainment system, setting temperature and ventilation preferences in a climate control application, etc.). Action(s) 230 may also include, for example, configuring a user interface of a control panel for the first occupant 238, where the user interface enables the first occupant 238 to adjust at least one function of vehicle 202 (e.g., vehicle entertainment system or vehicle climate control system, etc.).

In one embodiment, the machine-learning model 228 may identify the first occupant 238 as having a classification 114 (e.g., driver with learner's permit), and may identify second occupant(s) 240 as conflicting with restrictions on the first occupant 238 based on the classification 114 of the first occupant 238 (e.g., a driver with learner's permit may be allowed to drive alone or with one or more adults only). In one embodiment, machine-learning model 228 may identify that second occupant(s) 240 are under-age. Action 230 may include, for example, sending notification to the owner of the vehicle 202, or delaying or prohibiting operation of the vehicle 202, etc.

Figure 3:
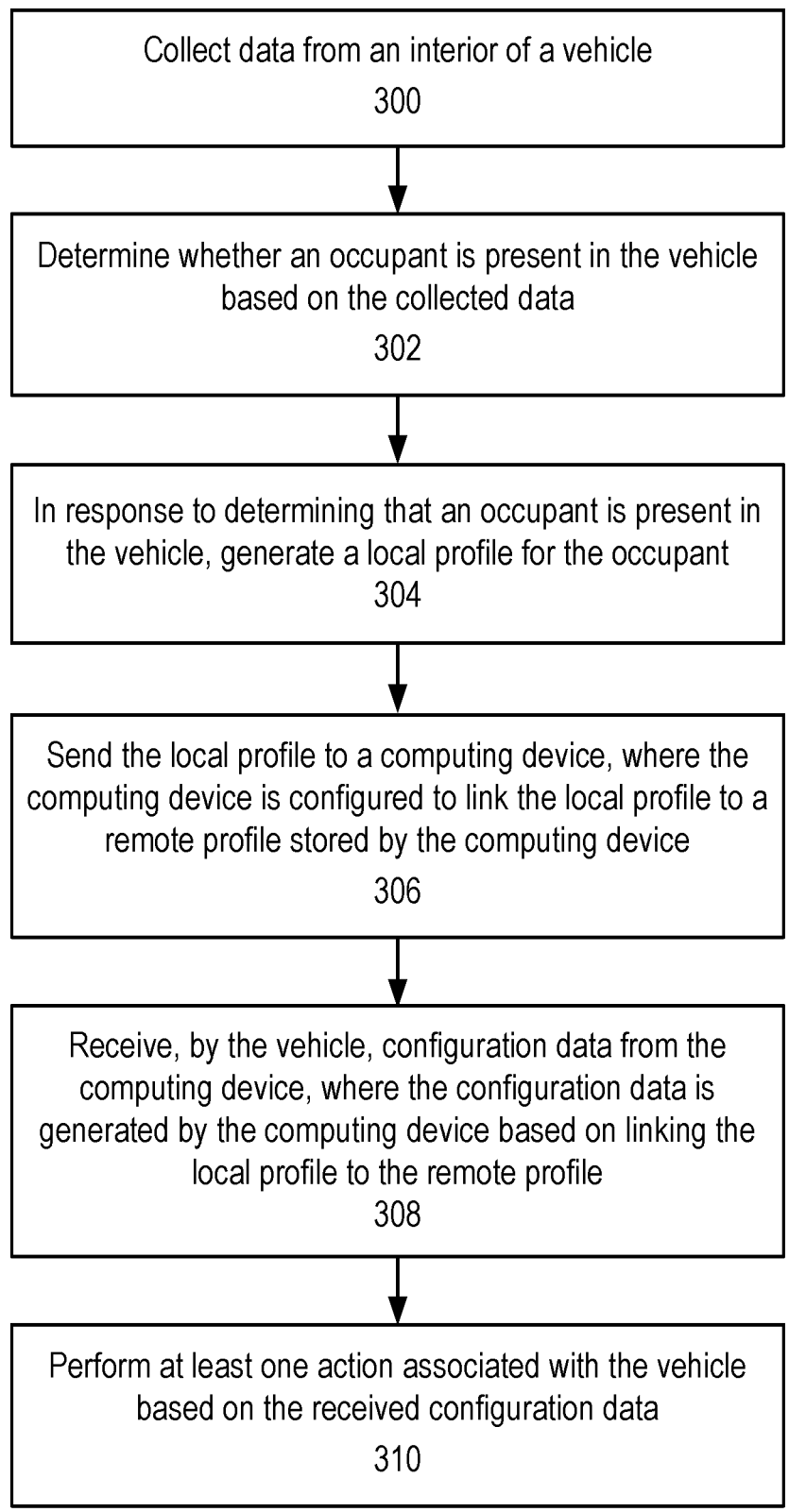
FIG. 3 shows a method for performing one or more actions for a vehicle based on configuration data requested from a remote computing device when an occupant has been determined to be located in the vehicle, in accordance with some embodiments.

FIG. 3 shows a method for performing one or more actions for a vehicle based on configuration data requested from a remote computing device when an occupant has been determined to be located in the vehicle, in accordance with some embodiments. For example, the method of FIG. 3 can be implemented in the system of FIGS. 1-2. In one example, vehicle 102 sends a request to computing device 132, which sends configuration data 136 in reply to the request.

The method of FIG. 3 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 3 is performed at least in part by one or more processing devices (e.g., processing device 104 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 300, data is collected from an interior of a vehicle. In one example, the collected data is data 126 collected by camera 124. In one example, the collected data is data 122 collected by one or more sensors 120.

At block 302, a determination is made whether an occupant is present in the vehicle based on the collected data. In one example, processing device 104 implements machine-learning model 128 to make a determination. In one example, data from camera 124 and/or sensor 120 is used as an input to an artificial neural network.

At block 304, in response to determining that an occupant is present in the vehicle, a local profile for the occupant is generated. In one example, local profile 112 is generated and stored in database 110.

At block 306, the local profile is sent to a computing device. The computing device is configured to link the local profile to a remote profile stored by the computing device. In one example, local profile 112 is sent to the computing device 132, which links local profile 112 to remote profile 134.

At block 308, the vehicle receives configuration data from the computing device. The configuration data is generated by the computing device based on linking the local profile to the remote profile. In one example, the vehicle 102 receives configuration data 136 from computing device 132. In one example, computing device 132 generates configuration data 136 based on linking local profile 112 to remote file profile 134.

At block 310, at least one action associated with the vehicle is performed based on the received configuration data. In one example, configuration data 136 is used to configure performance of one or more actions 130 by vehicle 102.

Figure 4:
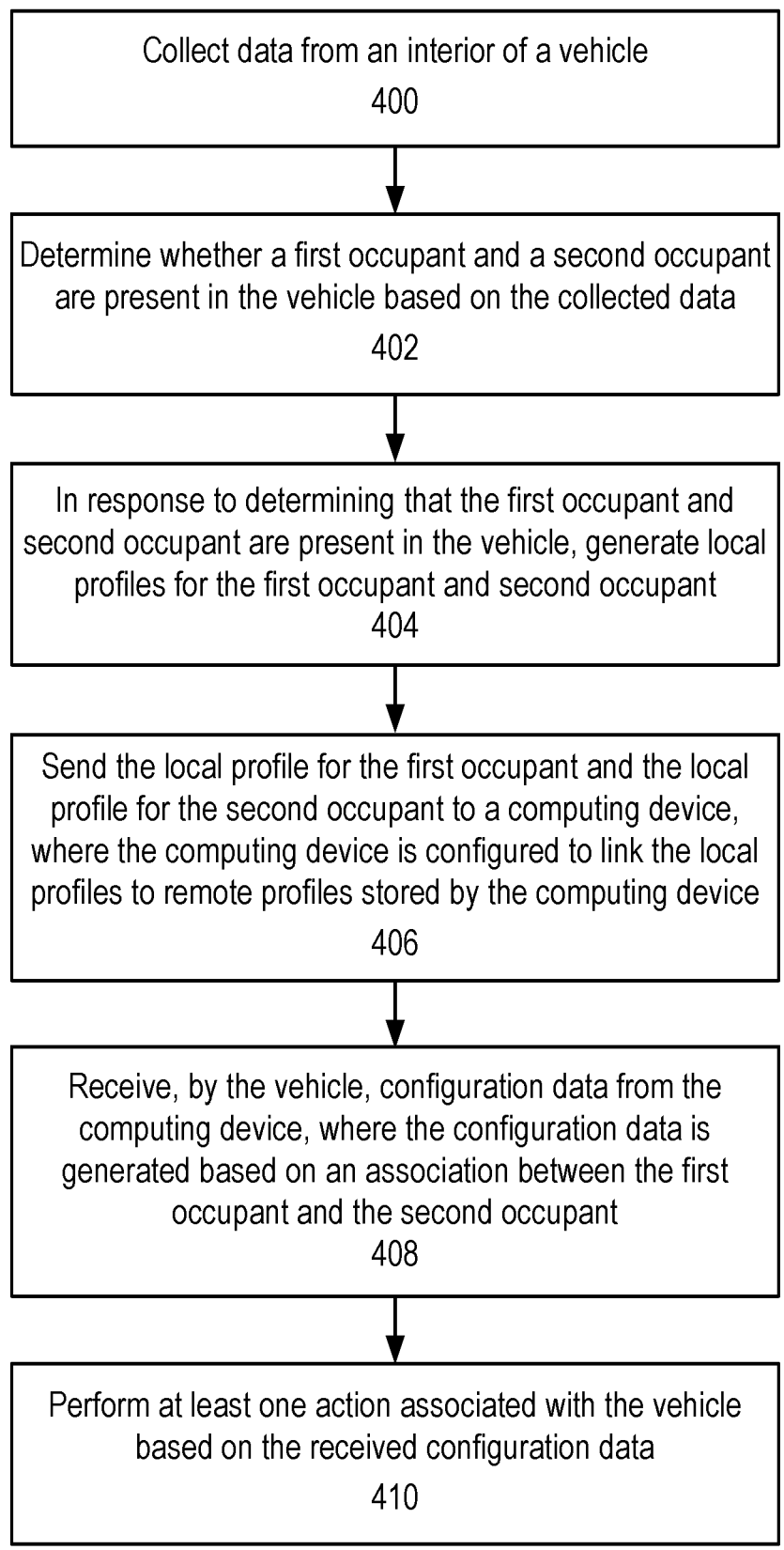
FIG. 4 shows a method for performing one or more actions for a vehicle based on configuration data requested from a remote computing device when multiple occupants have been determined to be located in the vehicle, in accordance with some embodiments.

FIG. 4 shows a method for performing one or more actions for a vehicle based on configuration data requested from a remote computing device when multiple occupants have been determined to be located in the vehicle, in accordance with some embodiments. For example, the method of FIG. 4 can be implemented in the system of FIG. 2. In one example, vehicle 202 sends a request to computing device 132, which sends configuration data in reply to the request.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., processing device 104 of FIG. 2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 400, data is collected from an interior of a vehicle. In one example, the collected data is data collected by camera 124. In one example, the collected data is data collected by one or more sensors 120.

At block 402, a determination is made whether a first occupant and a second occupant are present in the vehicle based on the collected data. In one example, the first occupant is first occupant 238 and the second occupant is second occupant 240. In one example, processing device 104 implements machine-learning model 228 to make the determination. In one example, facial images from camera 124 are used as input to an artificial neural network.

At block 404, in response to determining that the first occupant and second occupant are present in the vehicle, local profiles for the first occupant and second occupant are generated. In one example, local profiles 212 are generated for the first occupant and second occupant and stored in database 110.

At block 406, the local profile for the first occupant and the local profile for the second occupant are sent to a computing device. The computing device is configured to link the local profiles to remote profiles stored by the computing device. In one example, local profiles 112 are sent to computing device 132, which links local profiles 212 to remote profiles 234.

At block 408, the vehicle receives configuration data from the computing device. The configuration data is generated by the computing device based on an association between the first occupant and second occupant. In one example, the vehicle 202 receives configuration data from computing device 132. In one example, computing device 132 generates configuration data based on an association between the first occupant 238 and second occupant 240.

At block 410, at least one action associated with the vehicle is performed based on the received configuration data. In one example, the action is action 230 of vehicle 202. In one example, action 230 consists of configuring a user interface of a control panel for the first occupant 238.

In one embodiment, a method comprises: collecting data from an interior of a vehicle (e.g., vehicle 202); determining, based on the collected data, whether an occupant (e.g., occupant 216) is present in the interior; in response to determining that a first occupant (e.g., first occupant 238) is present in the interior, generating a local profile (e.g., local profile 212) for the first occupant; sending, via wireless communication, the local profile to a computing device (e.g., computing device 132), wherein the computing device is configured to link the local profile to a remote profile (e.g., remote profile 234) stored by the computing device; receiving, by the vehicle from the computing device, configuration data (e.g., configuration data 136, or data extracted or derived from remote profile 234, or retrieved or generated data based on remote profile 234), wherein the configuration data is generated by the computing device based on linking the local profile to the remote profile; and performing, based on the received configuration data, at least one action (e.g., action 230) associated with the vehicle.

In one embodiment, the method further comprises storing the local profile in a memory device (e.g., memory 106) of the vehicle.

In one embodiment, generating the local profile for the first occupant comprises: obtaining data (e.g., data 126) regarding a facial image of the first occupant; and storing the data regarding the facial image as part of the local profile.

In one embodiment, performing the at least one action comprises updating, using the configuration data, a machine-learning model (e.g., machine-learning model 128) used by the vehicle to control at least one function of the vehicle.

In one embodiment, performing the at least one action comprises enforcing a policy for the vehicle. In one example, the policy is enforced in accordance with configuration data 136 received from computing device 132. In one example, the policy describes security protocols and/or other procedures to be implemented in storing and/or processing data in vehicle 102.

In one embodiment, enforcing the policy comprises restricting at least one operation of the vehicle to be compliant with a navigation policy.

In one embodiment, the navigation policy is associated with a road on which the vehicle is traveling, and the navigation policy comprises at least one restriction regarding a speed of the vehicle. In one example, the navigation policy includes one or more restrictions and/or requirements regarding speed and/or manner of driving the vehicle.

In one embodiment, the method further comprises determining a classification for the first occupant. The local profile includes the classification, and performing the at least one action comprises performing an action that corresponds to the classification. In one example, the action is selection of a predetermined manner of driving based on the classification of an occupant that is a driver.

In one embodiment, the computing device is a server that stores profiles for occupants of a plurality of vehicles other than the vehicle. The remote profile comprises historical data regarding the first occupant when traveling in at least one other vehicle. The configuration data corresponds to a function of the vehicle performed by the first occupant when traveling in the at least one other vehicle. Performing the at least one action comprises performing the function.

In one embodiment, linking the local profile to the remote profile by the computing device comprises determining a correlation between the local profile and the remote profile.

In one embodiment, the computing device is further configured to generate the configuration data based on an output from a machine-learning model, and the local profile and the remote profile are inputs to the machine-learning model.

In one embodiment, the method further comprises determining that a second occupant is present in the interior. The remote profile contains data regarding an association between the first occupant and the second occupant, and the configuration data is generated based on the association. In one example, the association is membership of the first occupant and the second occupant in a social network (e.g., as determined by querying a social network server).

In one embodiment, the association corresponds to a configuration for at least one function of the vehicle used by the first occupant and the second occupant.

In one embodiment, performing the at least one action comprises configuring a user interface of a control panel (e.g., presented on a display in the vehicle) for the first occupant, wherein the user interface enables the first occupant to adjust at least one function of the vehicle.

In one embodiment, signaling is received from one or more sensors configured to monitor characteristics of an interior of a vehicle, the one or more sensors comprising at least one of an image sensor, a temperature sensor, a humidity sensor, or a pressure sensor, or any combination thereof. The sensors collect data regarding a sound, appearance, or activity of an occupant in the interior of the vehicle.

Based on the received signaling, a processor determines whether an occupant is present in the interior of the vehicle.

In one embodiment, a system comprises: at least one camera; memory configured to store a database of local profiles, wherein facial image data for the local profiles is collected using the at least one camera; at least one processing device; and memory containing instructions configured to instruct the at least one processing device to: collect, using the at least one camera, data from an interior of a vehicle; determine, based on the collected data, whether an occupant is present in the interior; in response to determining that a first occupant is present in the interior, generate a first local profile for the first occupant, wherein the first local profile comprises facial image data associated with the first occupant; store, in the database, the first local profile; send, via wireless communication, the first local profile to a computing device, wherein the computing device is configured to link the first local profile to a remote profile stored by the computing device; receive, from the computing device, configuration data, wherein the configuration data is generated by the computing device based on linking the local profile to the remote profile; and perform, based on the received configuration data, at least one action.

In one embodiment, performing the at least one action comprises collecting sensor data from at least one sensor of the vehicle, and storing the sensor data in the first local profile.

In one embodiment, the instructions are further configured to instruct the at least one processing device to send the sensor data to the computing device. The computing device is further configured to update the remote profile based on the sensor data.

In one embodiment, a field of view of the at least one camera is directed towards the rear of the vehicle to capture facial images for occupants in seats of the vehicle.

In one embodiment, a non-transitory computer-readable medium stores instructions which, when executed on a controller, cause the controller to at least: collect, using at least one sensor, data from an interior of a vehicle; determine, based on the collected data, whether an occupant is present in the interior; in response to determining that a first occupant is present in the interior, generate a local profile for the first occupant; send, using a wireless communication interface of the vehicle, the local profile to a server, wherein the server is configured to link the local profile to a remote profile stored in a database accessible by the server; receive, by the vehicle from the server, configuration data, wherein the configuration data is generated by the server based on linking the local profile to the remote profile; and perform, based on the received configuration data, at least one action associated with the vehicle.

In one embodiment, generating the local profile for the first occupant comprises: obtaining, from at least one camera of the vehicle, data regarding a facial image of the first occupant, wherein the at least one sensor does not include the at least one camera; and storing, in a memory device of the vehicle, the local profile, wherein the local profile includes the data regarding the facial image.

In some embodiments, a user profile (e.g., local profile 112, remote profile 134, a combination thereof, and/or configuration data 136) is used for a vehicle. The user profile or data derived therefrom is used as part of controlling vehicle systems, such as vehicle infotainment systems and passenger comfort systems. For example, the user profile data can be provided to a controller of a vehicle system.

In one embodiment, a user profile (e.g., a local profile) can include various aspects, such as identity, preferences in different categories, histories of activities in different categories, etc. A selectively authorized portion of a user profile can be used, deployed, and/or stored in a vehicle for use by the vehicle to personalize services for the user. A security protocol can control the information in the user profile that is accessible to the vehicle, the information relating to the user activity in the vehicle that can be propagated to a remote computing device (e.g., computing device 132), and the information the vehicle can retain about the user activity in the vehicle (e.g., the data that can be stored in memory 106, such as configuration data 136 received from computing device 132).

In one embodiment, data generated and collected (e.g., by processing device 104) from a body control module, a powertrain control module, or another type of control module of a vehicle (e.g., vehicle 102) can relate to user activity in the vehicle. In one example, this generated data can be an input to machine learning model 128 (e.g., to identify an occupant, and/or to perform an action 130). Also, storing, in memory of the vehicle, of data sent from a control module can be according to a protocol to regulate the manner in which the data can be used by the vehicle. Further, the type of information the vehicle is permitted to store can include predetermined types of information relating to user activity in the vehicle. In one embodiment, a vehicle can use and generate information about a user (such as information that can be a part of a user profile).

An example vehicle in some embodiments can include a body, a powertrain, vehicle electronics, and a computing system. The vehicle can have a user profile stored in memory of the vehicle according to a protocol. The computing system of the vehicle can be configured to retrieve information from a user profile according to the protocol. The computing system of the vehicle can also be configured to receive a request for at least a part of the retrieved information from vehicle electronics and send a portion of the retrieved information to the vehicle electronics according to the request and/or the protocol. The computing system of the vehicle can also be configured to transmit information from the vehicle electronics to a remote computing device (e.g., to transmit data for storage in a remote profile according to the protocol). Also, the computing system of the vehicle can be configured to store in its memory, according to a protocol, data sent from vehicle electronics or other components of the vehicle.

In some embodiments, the powertrain of a vehicle can be attached to a body and/or a chassis of the vehicle. The powertrain of the vehicle can include an engine, suspension and steering systems, and a final drive. The final drive can include at least one of wheels, a continuous track, propeller, a reaction-propulsion or electric-propulsion drive, or any combination thereof. The vehicle electronics of such a vehicle can include electronics for the body, or the powertrain, or any combination thereof.

At least some embodiments disclosed herein can be, include, or be a part of a networked system that includes computing devices (e.g., mobile devices) and vehicles and that is configured to implement deployments of user profiles in vehicles (e.g., deployment by wirelessly transmitting from a central server via a protocol). Such a system can include a vehicle that includes at least a body, a powertrain, vehicle electronics, and a computing system. The system can also include a mobile device that includes at least a user interface and a computing system. Also, the system can include one or more computing devices (such as devices in cloud computing or peer-to-peer computing) that can communicate a user profile to a remote computing device (e.g., a mobile device of a user).

In some embodiments, the user interface (UI) of a mobile device can include various types of UI. The computing system of the mobile device can be configured to: receive a request from a vehicle for data in a remote profile; send, to the vehicle, data from the remote profile according to the request; receive, from the vehicle, data obtained from a body control module or a powertrain control module of the vehicle; and update the remote profile with at least part of the data from the body control module or the powertrain control module.

Also, the computing system can be configured to use at least part of the retrieved information of a local or remote profile to provide input for analytics. The analytics can include analytics of data retrieved from a plurality of user profiles. The analytics can provide data for adding to a user profile according to the analytics. At least part of data from a user profile can be used as input for machine learning to generate statistics and other machine-learned data to be combined with generated statistics and other machine learned data. The machine learning can be used to add data to a user profile according to the generated statistics and other machine-learned data.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

As used herein, a computer-readable medium can include one or more memory devices. Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving signaling from one or more sensors configured to monitor characteristics of an interior of a vehicle, the one or more sensors comprising at least one of an image sensor, a temperature sensor, a humidity sensor, or a pressure sensor, or any combination thereof, wherein the sensors collect data regarding a sound, appearance, or activity of an occupant in the interior of the vehicle;
   determining, based on the received signaling, whether an occupant is present in the interior of the vehicle;
   in response to determining that a first occupant is present in the interior, generating a local profile for the first occupant;
   determining that a second occupant is present in the interior;
   sending, via wireless communication, the local profile to a computing device, wherein the computing device is configured to link the local profile to a remote profile stored by the computing device, wherein the remote profile contains data regarding an association between the first occupant and the second occupant;
   receiving, by the vehicle from the computing device, configuration data, wherein the configuration data is generated by the computing device based on the association between the first occupant and the second occupant, based on linking the local profile to the remote profile, and based on an output from a machine-learning model, whereby the local profile and the remote profile are inputs to the machine-learning model, the remote profile is stored on a social network server and the machine-learning model uses data from the social network server including at least one social network account to augment data in the local profile; and
   performing, based on the received configuration data, at least one action for the vehicle, wherein performing the at least one action comprises configuring a user interface of a control panel for the first and second occupant, and wherein the user interface enables both the first and second occupant to adjust at least one first function of an entertainment system of the vehicle;
   wherein the machine-learning model is trained to identify a classification of the first occupant;
   wherein the second occupant conflicts with at least one restriction on the first occupant based on the classification;
   wherein the machine-learning model is further trained using images and voice recordings of the first and second occupant gathered by the sensors;
   wherein the images and voice recordings of the first and second occupant used for the training of the machine-learning model are captured under different lighting conditions and for different clothing of the first and second occupant.

2. The method of claim 1, further comprising storing the local profile in a memory device of the vehicle.

3. The method of claim 1, wherein generating the local profile for the first occupant comprises:
   obtaining data regarding a facial image of the first occupant; and
   storing the data regarding the facial image as part of the local profile.

4. The method of claim 1, wherein performing the at least one action further comprises updating, using the configuration data, a machine-learning model used by the vehicle to control at least one second function of the vehicle.

5. The method of claim 1, wherein performing the at least one action comprises enforcing a policy for the vehicle.

6. The method of claim 5, wherein enforcing the policy comprises restricting at least one operation of the vehicle to be compliant with a navigation policy.

7. The method of claim 6, wherein the navigation policy is associated with a road on which the vehicle is traveling, and the navigation policy comprises at least one restriction regarding a speed of the vehicle.

8. The method of claim 1, wherein
the local profile includes the classification of the first occupant; and
performing the at least one action further comprises performing an action that corresponds to the classification.

9. The method of claim 1, wherein:
the computing device is a server that stores profiles for occupants of a plurality of vehicles other than the vehicle;
the remote profile comprises historical data regarding the first occupant when traveling in at least one other vehicle;
the configuration data corresponds to a second function of the vehicle performed by the first occupant when traveling in the at least one other vehicle; and
performing the at least one action further comprises performing the second function.

10. The method of claim 1, wherein linking the local profile to the remote profile by the computing device comprises determining a correlation between the local profile and the remote profile.

11. A system comprising:
at least one camera;
at least one sensor;
memory configured to store a database of local profiles, wherein facial image data for the local profiles is collected using the at least one camera;
at least one processing device; and
memory containing instructions configured to instruct the at least one processing device to:
collect, using the at least one camera, data from an interior of a vehicle;
determine, based on signaling from the camera, whether an occupant is present in the interior;
in response to determining that a first occupant is present in the interior, generate a first local profile for the first occupant, wherein the first local profile comprises facial image data associated with the first occupant;
store, in the database, the first local profile;
send, via wireless communication, the first local profile to a computing device, wherein the computing device is configured to link the first local profile to a remote profile stored by the computing device;
determine that a second occupant is present in the interior;
receive, from the computing device, configuration data, wherein the configuration data is generated by the computing device based on linking the first local profile to the remote profile and based on an output from a machine-learning model, whereby the first local profile and the remote profile are inputs to the machine-learning model, the machine-learning model is configured to identify a classification of the first occupant and that the second occupant conflicts with at least one restriction on the first occupant based on the classification, the remote profile is stored on a social network server and the machine-learning model uses data from the social network server including at least one social network account to augment data in the first local profile; and
perform, based on the received configuration data, at least one action for the vehicle, wherein performing the at least one action comprises restricting operation of the vehicle by the first occupant based on the restriction;
wherein the classification indicates whether the first occupant is a driver, and the action includes selection of a predetermined manner of driving;
wherein the machine-learning model is trained using images of the first and second occupant gathered by the camera, and voice recordings of the first and second occupant collected by the at least one sensor;
wherein the images and voice recordings of the first and second occupant used for the training of the machine-learning model are captured under different lighting conditions and for different clothing of the first and second occupant;
wherein the images and voice recordings are stored in a database used for training the machine-learning model.

12. The system of claim 11, wherein performing the at least one action further comprises:
collecting sensor data from the at least one sensor of the vehicle; and
storing the sensor data in the first local profile.

13. The system of claim 12, wherein the instructions are further configured to instruct the at least one processing device to send the sensor data to the computing device, wherein the computing device is further configured to update the remote profile based on the sensor data.

14. The system of claim 11, wherein a field of view of the at least one camera is directed towards the rear of the vehicle to capture facial images for occupants in seats of the vehicle.

15. A non-transitory computer-readable medium storing instructions which, when executed by a processor, cause the processor to at least:
collect, using at least one sensor, data from an interior of a vehicle;
determine, based on signaling from the sensor, whether an occupant is present in the interior;
in response to determining that a first occupant is present in the interior, generate a local profile for the first occupant;
send, using a wireless communication interface of the vehicle, the local profile to a server, wherein the server is configured to link the local profile to a remote profile stored in a database accessible by the server;
determine that a second occupant is present in the interior;
receive, by the vehicle from the server, configuration data, wherein the configuration data is generated by the server based on linking the local profile to the remote profile and based on an output from a machine-learning model, whereby the local profile and the remote profile are inputs to the machine-learning model, the machine-learning model is configured to identify a classification of the first occupant and to identify the second occupant conflicts with at least one restriction on the first occupant based on the classification; and
perform, based on the received configuration data, at least one action for the vehicle, wherein performing the at least one action comprises restricting operation of the vehicle by the first occupant based on the restriction;

wherein the machine-learning model is trained using images and voice recordings of the first and second occupant gathered by the at least one sensor;

wherein the images and voice recordings of the first and second occupant used for the training of the machine-learning model are captured under different lighting conditions and for different clothing of the first and second occupant.

16. The non-transitory computer-readable medium of claim 15, wherein generating the local profile for the first occupant comprises:

obtaining, from at least one camera of the vehicle, data regarding a facial image of the first occupant; and storing, in a memory device of the vehicle, the local profile, wherein the local profile includes the data regarding the facial image.

\* \* \* \* \*